(12) United States Patent
Weber

(10) Patent No.: US 7,383,729 B2
(45) Date of Patent: Jun. 10, 2008

(54) TUNING FORK GYRO WITH SENSE PLATE READ-OUT

(75) Inventor: Mark W. Weber, Zimmerman, MN (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/548,966

(22) Filed: Oct. 12, 2006

(65) Prior Publication Data

US 2008/0087081 A1  Apr. 17, 2008

(51) Int. Cl.
*G01P 9/04* (2006.01)
*G01C 19/00* (2006.01)

(52) U.S. Cl. .................... 73/504.12; 73/504.14

(58) Field of Classification Search ........... 73/504.12, 73/504.14, 504.15, 504.16, 504.04, 514.32, 73/514.29
See application file for complete search history.

(56) References Cited

U.S. PATENT DOCUMENTS

| | | | | |
|---|---|---|---|---|
| 5,672,949 A | * | 9/1997 | Ward | 318/609 |
| 5,911,156 A | * | 6/1999 | Ward et al. | 73/504.16 |
| 6,415,664 B2 | * | 7/2002 | Iwaki et al. | 73/504.12 |
| 6,993,969 B2 | * | 2/2006 | Higuchi | 73/504.14 |
| 7,213,458 B2 | * | 5/2007 | Weber et al. | 73/504.12 |
| 7,231,824 B2 | * | 6/2007 | French et al. | 73/504.12 |

* cited by examiner

*Primary Examiner*—Helen Kwok
(74) *Attorney, Agent, or Firm*—Black Lowe & Graham PLLC

(57) ABSTRACT

A micro-electromechanical (MEM) device includes a proof mass resiliently mounted to a substrate. The proof mass has first and second combs formed on opposite sides thereof and is electrically coupled to ground. A fixed drive comb is interleaved with the first comb of the proof mass. A fixed pick-off comb is interleaved with a portion of the second comb of the proof mass. A fixed bias comb is interleaved with the second proof mass comb. A substantially direct current (DC) bias is applied to the fixed bias comb. A substantially constant voltage is also exerted on a sense plate beneath the proof mass. The sense plate and bias comb are coupled to a charge amp through capacitors such that transient currents induced by motion of the proof mass will cause current to flow to a charge amp.

17 Claims, 3 Drawing Sheets

TUNING FORK GYRO WITH SENSE PLATE READ-OUT

BACKGROUND OF THE INVENTION

A tuning fork gyro, such as is shown in FIG. 1, induces oscillation of a proof mass 10 in a drive direction 12. Rotational movement in direction 14 perpendicular to the drive direction 12 results in acceleration of the proof mass 10 in a sense direction 16 perpendicular to the drive direction 12 in a phenomenon known as Coriolis' force. In the typical set up, two proof masses 10 are used. The two proof masses 10 oscillate 180 degrees out of phase, such that they are always moving in opposite directions. As a result, the Coriolis's force imposed on the proof masses 10 will also be in opposite directions.

Movement of the proof mass 10 along the sense direction 16 changes the capacitance between the proof mass 10 and a sense plate 18 positioned below the proof mass 10. The sense plate 18 is maintained at a constant voltage ($\pm V_S$) such that changes in capacitance will induce a voltage in the proof mass 10. The proof mass 10 is connected to a charge amp 20, which converts the current induced by the changing capacitance into an output voltage ($V_O$). $V_O$ may therefore be used to calculate the extent of Coriolis' force experienced by the proof mass 10.

Oscillation is induced by a drive comb 22 and pick-off comb 24. An alternating current (AC) drive voltage ($V_{D+}$, $V_{D-}$) applied to the drive comb 22 attracts the proof mass 10 due to capacitative charge build-up on the drive comb 22 and proof mass 10. Movement of the proof-mass 10 changes the capacitance between the proof mass 10 and the pick-off comb 24, resulting in a signal ($V_{PO}$), which is fed back to a drive circuit 26 and used to determine the magnitude and phase of $V_D$ effective to cause the proof mass 10 to oscillate.

The proof mass 10 is elastically mounted to a substrate 28 by means of flexures 30 secured to the substrate 28 by means of pads 31. Due to imperfections in the flexures 30, oscillation of the proof mass 10 induced by $V_D$ is not entirely parallel to the drive direction 12. Instead, the proof mass 10 moves along a trajectory having components parallel to both the drive direction 12 and the sense direction 16. The extent of this movement along the sense direction 16 is often large enough to saturate the output of the gyro such that movement along the sense direction 16 induced by Coriolis' force cannot be distinguished.

Prior systems compensated for out-of-plane movement caused by the flexures by adding a direct current (DC) bias voltage ($V_B$) to $V_D$. As the proof mass 10 oscillates relative to the drive comb 24, the voltage $V_B$ applied to the drive comb 24 induces an oscillating current flow in the proof mass 10 due to changes in the capacitative distance between the drive comb 24 and proof mass 10. The value of $V_B$ is selected such that the magnitude of the current flow induced in the proof mass 10 has the opposite polarity but the same magnitude as current flow induced by out-of-plane movement caused by imperfections in the flexures 30.

The primary weakness of this system is that imperfections in the input signal ($V_D+V_B$) pass directly to the proof mass 10 and therefore to $V_O$. As a result, bias, noise, and the like, caused by imperfections in the drive electronics show up in the output signal. Inasmuch as $V_D$ and $V_B$ are both large relative to the signals generated by Coriolis' force, the noise inherent in them significantly degrades the accuracy of measurements.

It would therefore be an advancement in the art to provide a tuning fork gyro compensating for out-of-plane movement induced by flexure imperfections without introducing input signal noise into the output signal.

SUMMARY OF THE INVENTION

A micro-electromechanical (MEM) device according to the invention includes a proof mass resiliently mounted to a substrate. The proof mass has first and second combs formed on opposite sides thereof. A fixed drive comb is interleaved with the first comb of the proof mass. A fixed pick-off comb is interleaved with a portion of the second comb of the proof mass. A fixed bias comb is interleaved with the second proof mass comb. A substantially direct current (DC) bias is applied to the fixed bias comb.

A substantially constant voltage is also exerted on the sense plate beneath the proof mass. The proof mass itself is grounded. The sense plate and bias comb are coupled to a charge amp through capacitors such that transient currents induced by motion of the proof mass will cause current to flow to the charge amp. The voltage exerted on the proof mass has a sign and magnitude such that currents induced by variation in the capacitative distance between the proof mass and the bias comb will have a magnitude and sign substantially countering currents induced in the sense plate by out-of-plane motion due to flexure imperfections.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
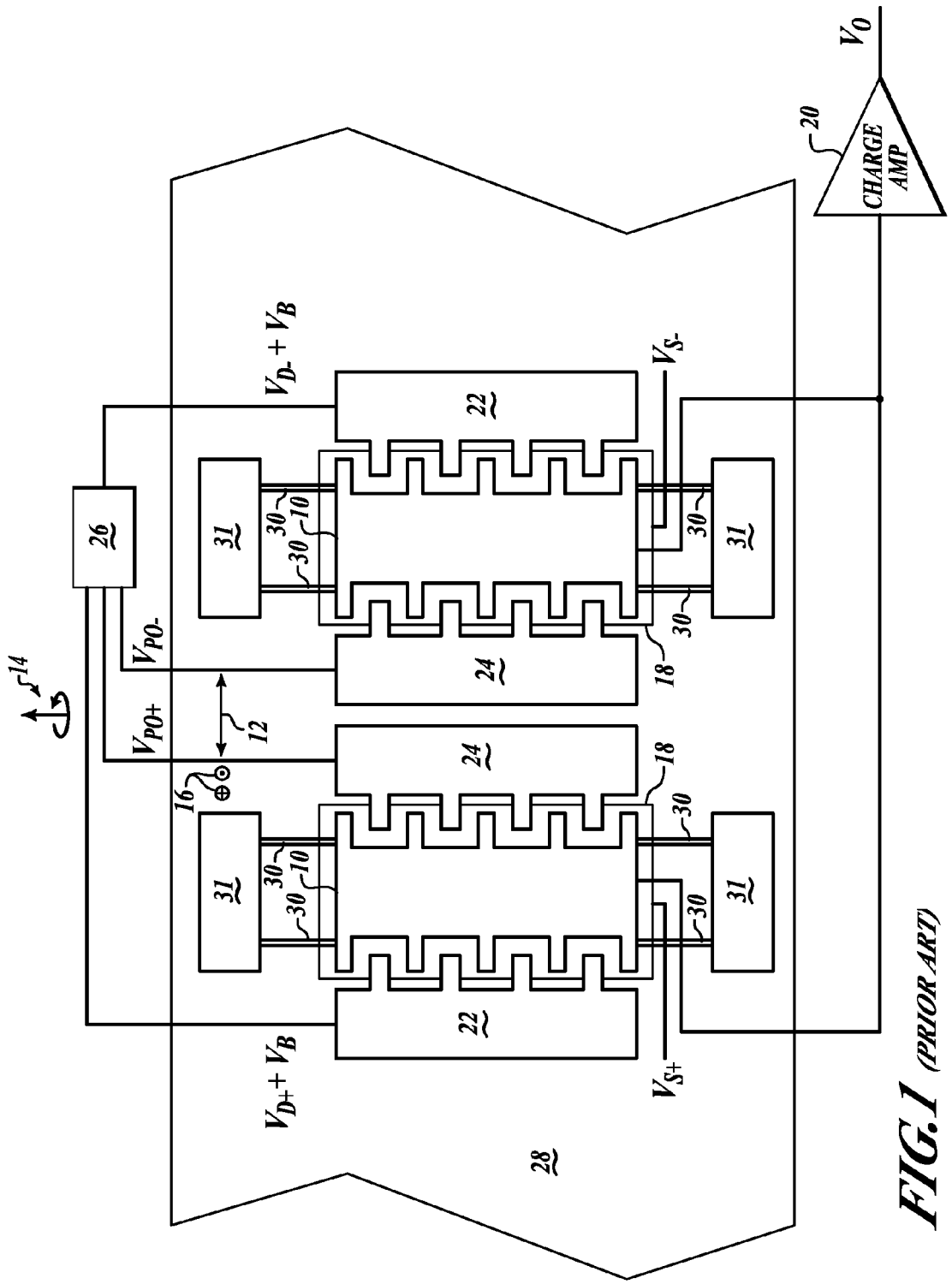
FIG. 1 is top plan view of a proof mass gyro in accordance with the prior art.
Figure 2:
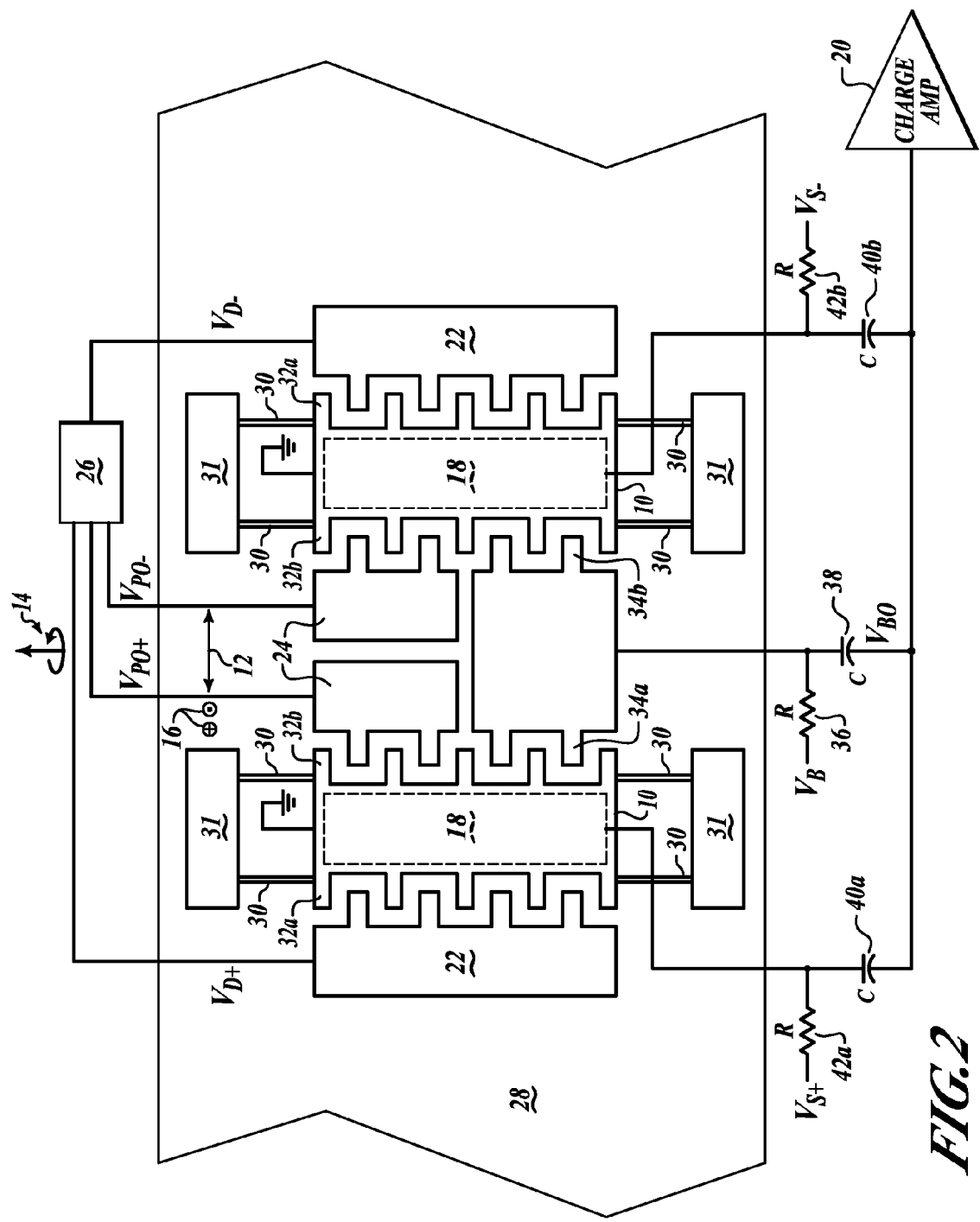
FIG. 2 is a top plan view of a proof mass gyro in accordance with an embodiment of the present invention.

Referring to FIG. 2, in one embodiment of the invention two or more proof masses 10 are resiliently mounted above a substrate by means of flexures 30 secured to pads 31. The proof masses 10 each have combs 32a, 32b located on opposite sides. The combs 32a are interleaved with the drive combs 22 and pick-off combs 24 are interleaved with the pick-off combs 24 to form a capacitative gap therebetween. Motor bias combs 34a, 34b are each interleaved with one of the combs 32a, 32b of the proof masses 10 to form a capacitative gap. Changes in the voltage of the drive combs 22 will induce movement of the proof masses 10 and movement of the proof masses 10 will induce a current in the pick-off combs 24 and motor bias combs 34a, 34b due to change in size of the capacitative gap.

In the illustrated embodiment, the motor bias combs 34a, 34b interact with the proof masses 10 to convert the motion of the proof masses 10 into an oscillating signal $V_{BO}$ serving to offset out-of-plane movement caused by flexure imperfections. The bias combs 34a, 34b interact with the proof masses 10 by means of the combs 32b. The number of teeth in the pick-off combs 24 may be reduced as compared with prior systems to accommodate the bias combs 34a, 34b. In an alternative embodiment, the bias combs 34a, 34b are interleaved with the combs 32a of the proof masses 10 and the number of teeth in the drive combs 22 is reduced. In the illustrated embodiment, the bias combs 34a, 34b are electrically coupled to one another, such as by forming the bias combs 34a, 34b as a monolithic silicon structure formed on an insulating layer.

A DC bias $V_B$ is imposed on the motor bias combs 34a, 34b in order to achieve an oscillating signal $V_{BO}$ in response to changes in the capacitive distance between the motor bias combs 34a, 34b and the proof masses 10. Inasmuch as $V_B$ is a DC signal it is much less prone to noise and errors. Accordingly, coupling $V_B$ to the charge amp 20 does not introduce significant error into the output of the charge amp 20. The signal $V_B$ is preferably applied to the motor bias combs 34a, 34b through a resistor 36. The oscillating signal $V_{BO}$ is input to the charge amp 20 by means of a capacitor 38.

The proof masses 10 themselves are grounded. In this manner, any current induced by the excitation voltage $V_D$ will flow to ground rather than result in an accumulated charge in the proof mass 10. Consequently, errors and noise in the excitation voltage $V_D$ do not pass in a substantial degree to the output. The mass and momentum of the proof masses 10 will tend to reduce the effect of noise and errors in $V_D$ on the motion of the proof mass 10, further reducing the effect of input signal errors on the output.

The sense plates 18 are coupled to the charge amp 20 by means of capacitors 40a, 40b. Out-of-plane motion of the proof masses 10, whether caused by flexure imperfections or Coriolis' force will cause current flow into or out of the sense plates 18, through the capacitors 40a, 40b, and into the charge amp 20. The sense plates 18 are maintained at a voltage $V_{S+}$ and $V_{S-}$ through a voltage exerted on the sense plates 18 through resistors 42a, 42b. The resistors 42a, 42b preferably connect directly to the sense plates 18, rather than through a capacitor.

The sense plates 18 in the illustrated embodiment do not underlie the drive combs 22 and pick-off combs 24. Inasmuch as the sense plates 18 provide the output signal, it is beneficial to reduce interaction between the sense plates 18 and the combs 22, 24.

The resistor 36 through which $V_B$ is exerted on the motor bias combs 34a, 34b and the resistors 42a, 42b through which $V_{S+}$ and $V_{S-}$ are exerted on the sense plate 18 are typically sufficiently large such that transient current flows induced by motion of the proof mass 10 will not flow through the resistors 36, 42a, 42b in significant amounts. The capacitor 38 coupling the motor bias combs 34a, 34b to the charge amp 20 and the capacitors 40a, 40b coupling the sense plates 18 to the charge amp 20 are typically sufficiently large such that transient current flows induced by the motion of the proof masses 10 will pass directly through the capacitors 38, 40.

The signal arriving at the charge amp 20 in the illustrated embodiment is a superposition of signals from the sense plates 18 and $V_{BO}$. The sign and magnitude of $V_B$ is chosen such that $V_{BO}$ will be opposite in sign but substantially equal in magnitude to the portion of the output of the sense plates 18 that is induced by flexure imperfections. The value and sign of $V_B$ necessary to achieve a compensating $V_{BO}$ may be determined experimentally by measuring the output of the sense plates 18 in the absence of acceleration. The value of $V_B$ may be determined experimentally at the time of manufacture and the experimentally derived $V_B$ may be exerted on the motor bias combs 34 during operation. Alternatively, a closed loop feedback system may be used to determine $V_B$ dynamically during operation.

Figure 3:
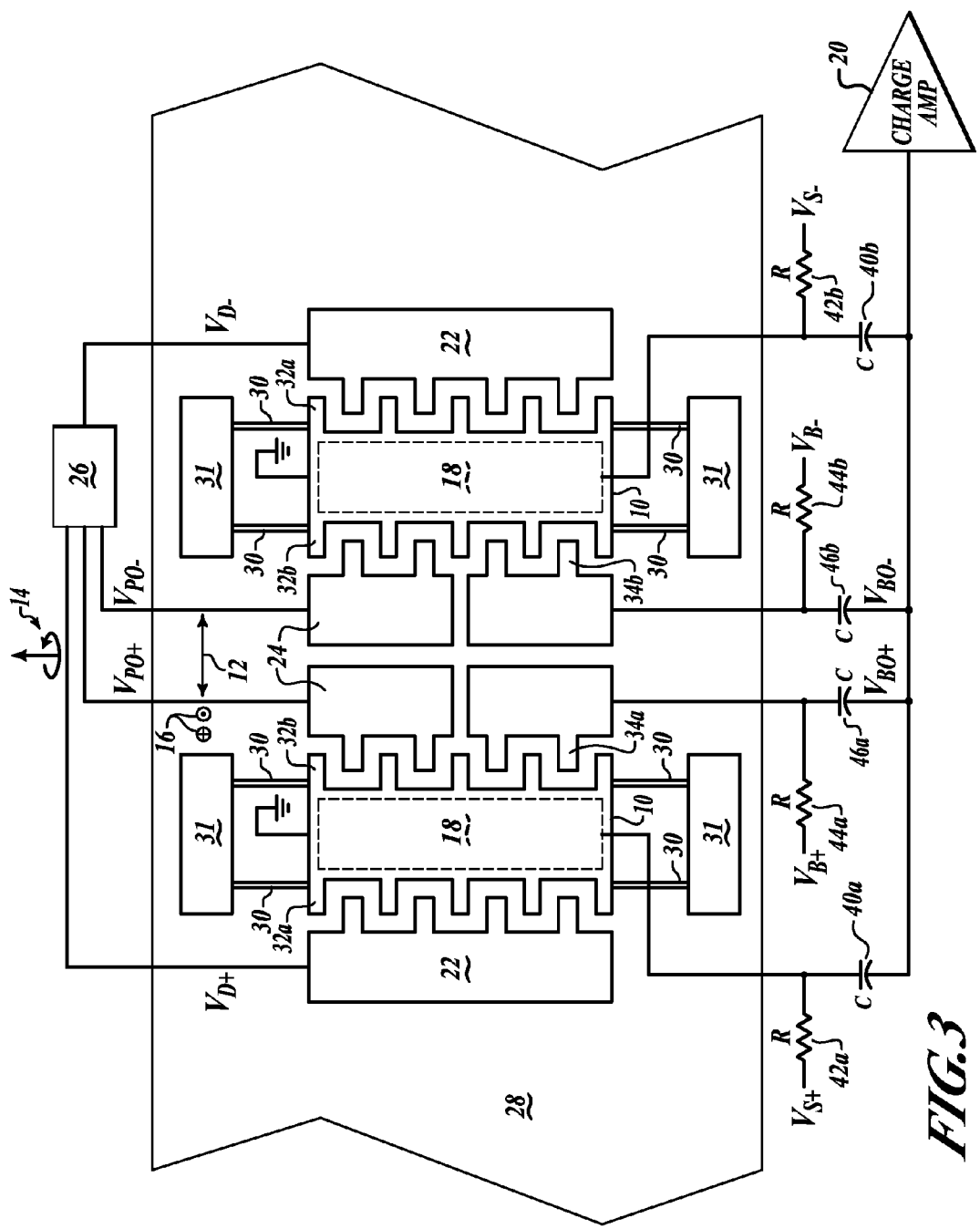
FIG. 3 is a top plan view of an alternative embodiment of a proof mass gyro in accordance with an embodiment of the present invention.

Referring to FIG. 3, in an alternative embodiment of the invention, the motor bias combs 34a, 34b are insulated from one another. Distinct bias signals $V_{B+}$ and $V_{B-}$ are imposed on the combs 34a, 34b through resistors 44a, 44b. The bias combs 34a, 34b generate distinct oscillating signals $V_{BO+}$ and $V_{BO-}$. The signals $V_{BO+}$ and $V_{BO-}$ may be coupled to the charge amp 20 by means of separate capacitors 46a, 46b or be combined upstream of capacitative coupling to the charge amp 20.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A micro-electromechanical device comprising:
    a substrate;
    a proof mass resiliently mounted to the substrate, the proof mass having first and second proof mass combs formed on opposite sides thereof, the first and second proof mass combs each comprising at least one tooth;
    a first fixed comb secured to the substrate and having at least one tooth, the first fixed comb interleaved with the first proof mass comb;
    second and third fixed combs electrically isolated from one another and each having at least one tooth, the second and third fixed combs interleaved with the second proof mass comb, the third fixed comb coupled to a substantially direct current (DC) bias circuit and capacitively coupled to an output; and
    a sense plate secured to the substrate beneath the proof mass, the sense plate electrically coupled to a substantially constant voltage source and capacitively coupled to the output;
    wherein one of the first and second fixed combs is coupled to an oscillating drive circuit and the other of the first and second fixed combs is coupled to a pick-off circuit electrically coupled to the oscillating drive circuit.

2. The device of claim 1, wherein a resistor is interposed between the sense plate and the substantially constant voltage source.

3. The device of claim 2, further comprising a charge amp interposed between the output and the sense plate and the third fixed comb.

4. The device of claim 3, wherein the proof mass is coupled to a ground.

5. The device of claim 1, wherein the proof mass is a first proof mass, the device further comprising a second proof mass resiliently mounted to the substrate and comprising third and fourth proof mass combs formed on opposite sides thereof and each having at least one tooth.

6. The device of claim 5, further comprising fourth, fifth, and sixth fixed combs each having at least one tooth, the fourth fixed comb interleaved with the third proof mass comb and coupled to a second oscillating drive circuit, the fifth and sixth fixed combs being electrically insulated from one another and interleaved with the fourth proof mass comb, the fifth fixed comb being electrically coupled to a second pick-off circuit electrically coupled to the second oscillating drive circuit, and the sixth fixed comb electrically coupled to a second substantially DC bias circuit.

7. The device of claim 6, wherein the third and sixth fixed combs are electrically coupled to one another.

8. The device of claim 7, wherein the third and sixth fixed combs are monolithically coupled to one another and positioned between the first and second proof masses.

9. The device of claim 6, wherein the sixth fixed comb is capacitively coupled to the output and wherein the sense plate is a first sense plate, the device further comprising a second sense plate secured to the substrate beneath the second proof mass, the second sense plate electrically coupled to a second substantially constant voltage source having a second resistor interposed therebetween, and wherein the second sense plate is capacitively coupled to the charge amp.

10. A micro-electromechanical (MEM) device comprising:
 a substrate;
  a proof mass resiliently mounted to the substrate, the proof mass having first and second proof mass combs formed on opposite sides thereof, the first and second proof mass combs each comprising at least one tooth;
  a first fixed comb secured to the substrate and having at least one tooth, the first fixed comb interleaved with the first proof mass comb;
  second and third fixed combs electrically isolated from one another and each having at least one tooth, the second and third fixed combs interleaved with the second proof mass comb, the third fixed comb coupled to a substantially direct current (DC) bias circuit and capacitively coupled to a charge amp; and
  a sense plate secured to the substrate beneath the proof mass, the sense plate electrically coupled to a substantially constant voltage source having a resistor interposed therebetween, the sense plate being capacitively coupled to the charge amp;
  wherein one of the first and second fixed combs is coupled to an oscillating drive circuit and the other of the first and second fixed combs is coupled to a pick-off circuit electrically coupled to the oscillating drive circuit.

11. The device of claim 10, wherein the substantially DC bias circuit generates a voltage corresponding to a magnitude of motion of the proof mass in a direction substantially perpendicular to the sense plate.

12. The device of claim 11, wherein the proof mass is a first proof mass, the device further comprising a second proof mass resiliently mounted to the substrate and comprising third and fourth proof mass combs formed on opposite sides thereof and each having at least one tooth.

13. The device of claim 12, further comprising fourth, fifth, and sixth fixed combs each having at least one tooth, the fourth fixed comb interleaved with the third proof mass comb, the fifth and sixth fixed combs being electrically insulated from one another and interleaved with the fourth proof mass comb.

14. The device of claim 13, wherein the third and sixth fixed combs are electrically coupled to one another.

15. The device of claim 13 wherein the substrate and the first and second proof masses are formed of silicon.

16. The device of claim 13, wherein the sixth fixed comb is capacitively coupled to the charge amp and wherein the sense plate is a first sense plate, the device further comprising a second sense plate secured to the substrate beneath the second proof mass, the second sense plate electrically coupled to a second substantially constant voltage source having a second resistor interposed therebetween, and wherein the second sense plate is capacitively coupled to the charge amp.

17. The device of claim 16, wherein the charge amp is coupled to an output.

* * * * *